(12) United States Patent
Buschulte et al.

(10) Patent No.: US 6,584,899 B1
(45) Date of Patent: *Jul. 1, 2003

(54) APPARATUS FOR FORM-PROCESSING PAPER IN A PRINTING PRESS

(75) Inventors: Rainer Buschulte, Bad Schönborn (DE); Clemens Rensch, Heidelberg (DE); Erich Zahn, Eppelheim (DE)

(73) Assignee: Heidelberger Druckmaschinen AG, Heidelberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/086,027

(22) Filed: May 28, 1998

Related U.S. Application Data

(62) Division of application No. 08/564,417, filed on Nov. 29, 1995, now Pat. No. 5,797,320.

(30) Foreign Application Priority Data

Nov. 29, 1994 (DE) .......................................... 44 42 411

(51) Int. Cl.[7] ................................................ B41F 13/56
(52) U.S. Cl. .............. 101/226; 219/121.68; 219/121.78
(58) Field of Search ................................ 156/266, 267, 156/269; 264/405; 428/195, 211, 98, 131, 43; 364/468.24; 83/13, 37, 213, 520; 219/121.18, 121.19, 121.6, 121.2, 121.28, 121.31, 121.67, 121.68, 121.7, 121.72, 121.74, 121.75, 121.77, 121.78, 121.85; 101/226, 227, 3.1, 32, 33, 224, 485; 234/13, 35, 41, 37–39, 42, 46, 55, 94, 95, 126; 347/118

(56) References Cited

U.S. PATENT DOCUMENTS

| | | | |
|---|---|---|---|
| 3,891,911 A | | 6/1975 | Frentress |
| 4,107,528 A | * | 8/1978 | Silverman .................... 250/317 |
| 4,322,802 A | | 3/1982 | Lewis, Jr. et al. |
| 4,378,480 A | * | 3/1983 | Langhans ............. 219/121 LK |
| 4,404,454 A | * | 9/1983 | Taylor et al. ......... 219/121 LK |
| 4,549,063 A | * | 10/1985 | Ang et al. ............. 219/121.77 |
| 4,586,089 A | * | 4/1986 | Nakazato et al. ........... 358/280 |
| 4,706,566 A | | 11/1987 | Kishine et al. |
| 4,736,446 A | * | 4/1988 | Reynolds et al. ............... 382/8 |
| 4,827,315 A | * | 5/1989 | Wolfberg et al. ........... 347/118 |
| 4,936,214 A | | 6/1990 | Overholser |
| 4,966,352 A | | 10/1990 | Nuttin |
| 4,972,209 A | * | 11/1990 | Tanigawa .................... 346/108 |

(List continued on next page.)

FOREIGN PATENT DOCUMENTS

| | | |
|---|---|---|
| DE | 26 14 941 | 1/1977 |
| DE | 27 48 497 | 5/1978 |
| DE | 31 09 228 C2 | 7/1986 |
| DE | 36 33 850 A1 | 3/1988 |
| DE | 39 10 291 A1 | 2/1990 |
| DE | 36 39 461 C2 | 9/1990 |
| DE | 39 38 663 A1 | 5/1991 |
| DE | 42 31 031 A1 | 3/1993 |
| DE | 41 33 312 A1 | 4/1993 |
| DE | 42 34 308 A1 | 4/1994 |
| DE | 42 38 387 A1 | 5/1994 |
| DE | 42 40 135 A1 | 6/1994 |
| DE | 43 14 601 A1 | 11/1994 |

*Primary Examiner*—Eugene H. Eickholt
(74) *Attorney, Agent, or Firm*—Laurence A. Greenberg; Werner H. Stemer; Gregory L. Mayback

(57) ABSTRACT

Method for form-processing paper in a printing press by at least one processing tool and a computer includes converting digital data representing desired processing geometries into signals in the computer, and controlling the at least one processing tool with the signals so as to obtain the processing geometries: and apparatus for performing the method.

14 Claims, 1 Drawing Sheet

U.S. PATENT DOCUMENTS

| | | | | |
|---|---|---|---|---|
| 4,985,780 A | * | 1/1991 | Garnier et al. | 219/121.68 |
| 5,158,499 A | * | 10/1992 | Guckenberger | 206/524.2 |
| 5,183,598 A | * | 2/1993 | Helle et al. | 264/22 |
| 5,185,511 A | * | 2/1993 | Yabu | 219/121.78 |
| 5,262,613 A | * | 11/1993 | Norris et al. | 219/121.68 |
| 5,346,455 A | * | 9/1994 | Volkert | 156/219 |
| 5,444,035 A | * | 8/1995 | Perrington et al. | 503/201 |
| 5,533,453 A | * | 7/1996 | Wolfberg et al. | 101/485 |
| 5,568,170 A | * | 10/1996 | Hirano et al. | 347/88 |
| 5,578,155 A | * | 11/1996 | Kawaguchi | 156/267 |
| 5,637,175 A | * | 6/1997 | Feygin et al. | 156/264 |
| 5,650,076 A | * | 7/1997 | Ben-David | 347/260 |
| 5,797,320 A | * | 8/1998 | Buschulte et al. | 101/226 |
| 5,818,717 A | * | 10/1998 | Nunes | 364/468.24 |
| 5,833,914 A | * | 11/1998 | Kawaguchi | 264/400 |
| 5,875,288 A | * | 2/1999 | Bronstein et al. | 395/109 |

* cited by examiner

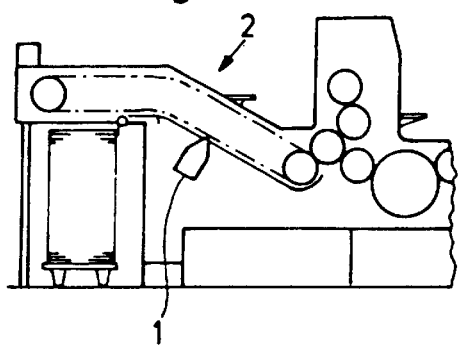
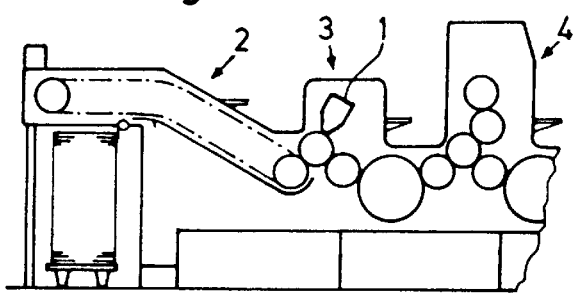
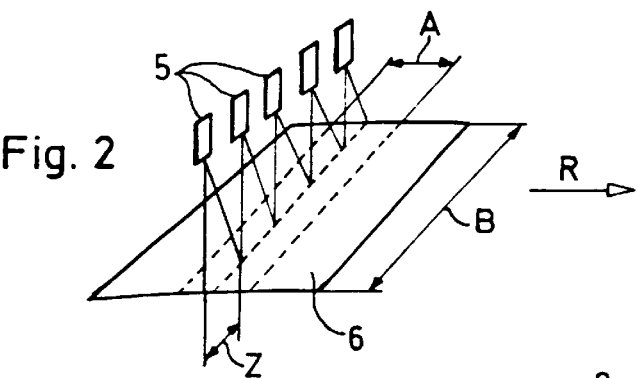
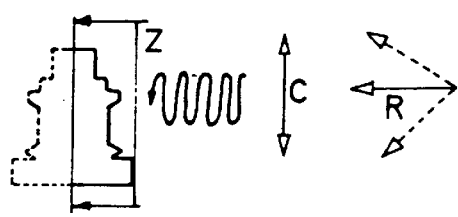
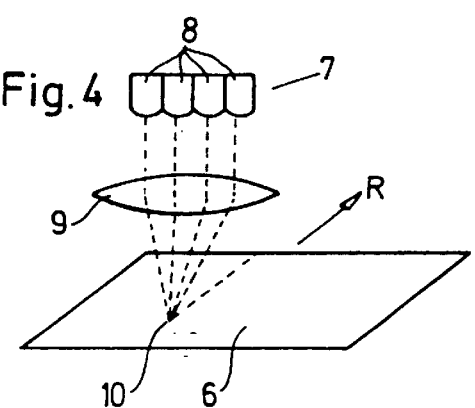
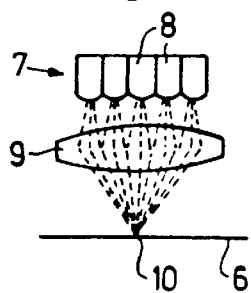
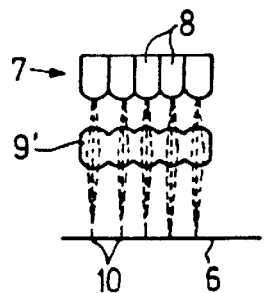
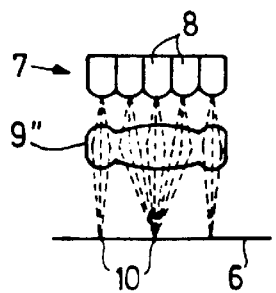

APPARATUS FOR FORM-PROCESSING PAPER IN A PRINTING PRESS

CROSS-REFERENCE TO RELATED APPLICATION

This application is a division of application Ser. No. 08/564,417, filed on Nov. 29, 1995, now U.S. Pat. No. 5,797,320.

BACKGROUND OF THE INVENTION

1. Field of the Invention

The invention relates to a method and apparatus for form-processing paper in a printing press by means of at least one processing tool. What is meant herein by form-processing is the forming of scores, creases, perforations or the like in the paper.

It has become known heretofore for such forming tools as cutting or scoring tools or perforating tools to be integrated into a printing press, so that the paper, after being printed, need not be separately cut to size or prepared for folding., The textbook entitled Maschinenbau [Machine Construction], VEB Verlag Technik Berlin 1968, Vol. 3/II, Chapter 1.5.3.5, pages 597–598, for example, shows a combined printing press and punching machine.

If a new printing job is to be performed with such a machine, generally the processing tools must be changed, or at least adjusted.

2. Summary of the Invention

It is accordingly an object of the invention to permit rapid and economical variation of processing geometries when form-processing paper in a printing press.

With the foregoing and other objects in view, there is provided, in accordance with the invention, a method for form-processing paper in a printing press by means of at least one processing tool and a computer, which comprises converting digital data representing desired processing geometries into signals in the computer, and controlling the at least one processing tool with the signals so as to obtain the processing geometries.

In accordance with another mode of the method according to the invention, the form-processing includes at least one of the processes of cutting, perforating, scoring and stitching.

In accordance with a further mode, the method according to the invention includes separately generating with the printing press the digital data for representing the processing geometries, and then transmitting the data to the printing press computer for calculating the control signals for the at least one processing tool.

In accordance with an added mode of the method according to the invention, the generation of the digital data is performed within the context of the printed product design in an electronic printing precursor stage, and the method includes adding color information to the digital data in a manner that one color, respectively, is assigned to each type of processing.

In accordance with an additional mode of the method according to the invention, the generation of the digital data in the printing precursor stage is in the form of postscript data, and the method includes converting the postscript data into a pixel pattern including at least one pixel pattern for one color to be printed and at least one pixel pattern which has a color assigned to one type of processing, and calculating in the printing press computer the control signals for the corresponding processing tool from the at least one pixel pattern.

In accordance with yet another mode, the method according to the invention includes defining a plurality of zones along the width of the printing press, assigning at least one processing tool to each of the zones and, during operation of the printing press, positioning and activating and deactivating the processing tools in a manner required by processing geometries in the corresponding zone.

In accordance with yet a further mode of the method according to the invention, the form-processing is performed with at least one beam of light, and the method comprises either tracking the contours to be form-processed or linearly scanning the surface of the paper, including turning the light beam on only at the contours to be form-processed.

In accordance with yet an added mode, the method according to the invention includes imprinting the geometry to be form-processed prior to processing with a color which absorbs the light used for the processing.

In accordance with yet an additional mode, the method according to the invention includes generating the light by laser.

In accordance with another aspect of the invention, there is provided an apparatus for form-processing paper in a printing press having at least one paper form-processing tool disposed adjacent to a paper path, comprising a computer having an input for digital data representing desired processing geometries and an output for control signals, the at least one processing tool being operatively connected to the computer and being activatable and deactivatable by the control signals, the at least one processing tool being positionable at least in part along the width of the printing press.

In accordance with another feature of the invention, the at least one paper form-processing tool is selected from the group consisting of a mechanical cutting tool, a perforating tool, a scoring tool and a stitching tool, and a water-jet cutting device.

In accordance with a further feature of the invention, the at least one paper form-processing tool is selected from the group consisting of a focused beam of light, a laser, and a laser optical element.

In accordance with an added feature of the invention, the apparatus includes a plurality of zones defined along the width of the printing press, and a plurality of the paper form-processing tools disposed along the width of the printing press and, respectively, assigned to each of the zones.

In accordance with an additional feature of the invention, the plurality of paper form-processing tools form a paper form-processing unit mountable on the printing press.

In accordance with yet another feature of the invention, the paper form-processing unit has a laser diode array extending over the width of the printing press.

In accordance with yet a further feature of the invention, the laser diode array is stationary, and at least one optical element is disposed between the laser diode array and a surface of paper.

In accordance with yet an added feature of the invention, the at least one optical element focuses light from at least one diode of the diodes of the laser diode array onto at least one focal point located on the paper.

In accordance with a concomitant feature of the invention, the at least one optical element is movable crosswise to the paper path.

By the foregoing provisions, the pressman is relieved of the task of arranging the processing tools to fit the printing job. The corresponding make-ready or conversion times are eliminated. The digital data for defining the geometry can be generated by means of available software and hardware which is used for designing the printed product in the electronic printing precursor stage. In other words, typesetting and the defining of the geometry can be performed in a single operation, and the processing task can subsequently be performed largely automatically.

In an apparatus for form-processing paper in a printing press having at least form-processing tool disposed adjacent to the paper path, the foregoing object is attained in accordance with the invention in that the at least one processing tool is activatable and deactivatable by means of the control signals and can at least in part be positioned along the width of the printing press, and a computer is provided which has an input for digital data representing desired processing geometries and an output for the control signals.

For greater freedom in construction or design and for higher processing speed, preferably a plurality of optionally different types of form-processing tools are used over the entire width of the paper, each of the tools being positionable and activatable and deactivatable, respectively, within an assigned zone along the width of the machine by means of the control signals.

Particularly great construction or design freedom is obtained if the processing is performed by focused light, for example, of the type produced by lasers; in that case, rounded corners and other filigreed contours can be produced quite easily. Compared with a combined printing press and punching machine with a male and female punching die, the copies printed on one sheet of paper to be printed can be spaced closer together, and the yield of imprinted material is greater, because no forces or only very slight forces, respectively, of separation and expulsion act perpendicularly to the surface of the imprinted material, and thus the stabilizing function of the skeleton formed by the trimmings is dispensed with.

It is true that cutting paper by laser has become conventional; see for example the article, "Papierschneiden mit Laser" [Paper Cutting by Laser] by H. Federle and S. Keller in the journal, Papier und Kunststoff-Verarbeiter [Paper and Plastics Processor], Number 9/92, pages 54–59. The versatility of laser cutting devices is of particular significance, however, if it is used in combination with printing presses as in the invention. Because digital data which represent the processing geometries can be produced in combination with the typesetting, and it is no longer necessary to make adjustments to the printing press itself, the invention makes it possible to form-process paper in a printing press with immediately variable processing geometries. Small runs of printed products which require complicated form-processing thus become considerably more economical. This is true to an even greater extent for digital printing presses which can be used as page printers because, with the invention, it is even possible for each page to undergo an individualized form-processing without impairment of the printing speed.

In digital printing presses, the method and apparatus according to the invention can moreover be achieved especially simply. For example, if the printing press computer already includes an RIP (raster image processor), which breaks down the digital data, generated as postscript data and representing the pixels and the colors thereof, into pixel patterns for the colored partial images then, in the printing precursor stage, the processing geometries and the kinds of form-processing are shown in the same format as the pixels and image colors. The software normally used in typesetting offers suitable capabilities for accomplishing this; one example is identifying one processing geometry and one type of form-processing by means of a frame having a color which is defined as a special color designated as "cutting". Because the processing geometries and types of form-processing are handled like special colors, the RIP generates a special pixel pattern for each kind of form-processing; this pattern is then suitably interpreted by the printing press computer and converted into the control signals for the form-processing tools.

Accordingly, to use the invention in a digital printing press, all that is needed is to provide a unit for actually performing the form-processing task. Otherwise, the existing devices and control methods can be used. Even older printing presses, however, can be retrofitted with such a unit without difficulty. The pixel patterns for the processing geometries are produced in this case in the RIP of a typesetting computer, for example. Moreover, lasers are not the only suitable form-processing tools. Given a suitable arrangement and combination, thoroughly flexible form-processing can be accomplished with mechanical processing tools.

On the other hand, in the case of contactless processing, for example using a laser, a further mode of the method according to the invention may be considered, which is for the geometry which is to cut, for example, to be preprinted using a light-absorbent printing ink, before performing the form-processing. The color may be black, for example, or may be visually imperceptible, as long as its light absorption is tuned to the spectrum of the cutting light and at least partially coincides therewith. Preprinting the cutting geometry has the following advantages: a defined absorption of the laser light is attained, which minimizes the influence upon the cutting capacity of the material to be imprinted, and thus minimizes the necessary adjustments and adaptations of the light parameters to the substrate; the cutting capacity is better because of the higher energy yield; a perforation need not be generated by modulating the beam of light; instead, it can be produced by means of a suitably preprinted broken line and a constant light incidence, thereby reducing the computer capacity and control expenditure required; the beam of light need not be focused precisely at the surface of the paper, so there is less vulnerability in terms of spacing distance and thus less tolerance to fluttering of the paper, for example; and the tracking of the beam need not be so exact.

Because less stringent demands are made with respect to focusing and because of the defined light absorption, it is, moreover, not absolutely necessary to use lasers for form-processing preprinted processing geometries; instead, conventional light sources can also be considered.

Other features which are considered as characteristic for the invention are set forth in the appended claims.

Although the invention is illustrated and described herein as embodied in apparatus for form-processing paper in a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWINGS

FIGS. 1a and 1b are diagrammatic side elevational views of a printing press illustrating two options for installing a paper form-processing unit therein;

FIG. 2 is a basic diagrammatic and schematic perspective view of the layout of the paper form-processing unit;

FIG. 3 illustrates schematically a method for guiding a beam in a laser-beam sheet form-processing tool;

FIG. 4 illustrates schematically the use of a laser diode array for the sheet form-processing; and FIGS. 5a to 5c illustrate schematically and diagrammatically three different optical elements for generating different beam characteristics in a laser diode array.

DESCRIPTION OF THE PREFERRED EMBODIMENTS

Referring now to the drawings and, first, particularly to FIGS. 1a and 1b thereof, there are shown diagrammatically therein respective paper form-processing units 1 which are integratable into an existing printing press module, such as a delivery device 2 in FIG. 1a, or may be a component of a separate processing section 3 which, in FIG. 1b, is provided between the delivery 2 and a printing unit 4. Although sheet-fed offset printing presses, in particular, have been shown in FIGS. 1a and 1b, the paper form-processing unit 1 may also be used in other kinds of printing presses.

As shown in FIG. 2, the processing unit 1 includes a number of processing tools 5, which are disposed in a row crosswise to a paper travel direction R. The processing tools 5, in the embodiment of the invention shown in FIG. 2, are laser light sources or output optical elements of laser light sources, the laser beams of which can be aimed towards various locations of the paper 6 by non-illustrated devices for beam deflection, or by mechanical laser head movements. Crosswise to the paper travel direction R, i.e., along the width B of the paper, the respective processing tools 5 sweep over one zone Z, the zones Z adjoining one another crosswise to the paper travel direction R and extending over the maximum possible paper width B or the working width of the printing press. The zones Z may also, however, overlap one another entirely or in part, or free zones without any processing tool associated therewith may be provided. The laser beams of the processing tools 5 can be guided not only with-in a given zone Z but also within a section A in the paper travel direction R, in order to be able to perform cutting motions which are directed perpendicularly to the paper travel direction R or counter to the paper travel.

The processing tools 5 which use laser light are suitable for selectively cutting, perforating, and scoring the paper 6. These and other types of processing can be achieved not only with lasers, which operate in contactless fashion, but also with mechanical processing tools, which must be capable of being positioned above the surface of the paper, and activated and deactivated, by means of control signals, so that the method described hereinbelow can be employed.

The preferred mode of the method for paper form-processing in accordance with the invention includes the following three partial steps, which are described hereinafter: definition of the processing geometries, in the printing precursor stage; data transfer to the printing press and interpretation of the data; and performing the processing task.

In the designing of a printed product in the electronic printing precursor stage, the processing geometries are defined using the design tools of the appropriate software. In such programs, one freely defined and designated color can be assigned to the frame of a square, for example. In the defining of a particular geometry, an arbitrary color is selected for that geometry and is designated as "perforating", "scoring", or "cutting", for example. On the screen used for electronic typesetting, the geometry appears in the color defined by the user. The postscript data generated by the electronic typesetting then include not only the picture information for the actual printing but also one or more processing geometries and a respective "color name" for the associated kind of processing.

The postscript data are transmitted to a digital printing press and separated in an RIP (raster image processor) into the color components C, M, Y and K, i.e., cyan, magenta, yellow and black, in the case of four-color printing, by being converted into individual pixel patterns (bit maps). A color for a processing geometry defined in a printing precursor stage is handled by the RIP like a special color, and the RIP accordingly prepares one additional, separate bit map for all the processing geometries, such as "square", etc., per type of processing, such as "cutting", "perforating", and so forth. From the bit maps for the color components, the printing press computer generates the control parameters for the image printing units and ink supplies. From the bit maps for the processing geometries, which are easily detected or interpreted as such from the identification by means of special colors, the printing press computer also calculates the control signals for the processing tools. Optionally, even other supplementary data, which cannot yet have been defined in the printing precursor stage, such as for the thickness of the paper, for example, can be input into the printing press computer.

The control signals calculated as described hereinabove are then supplied to the processing unit 1 and the processing tools 5 thereof, respectively, so that the processing tasks can be performed. Via control lines, the computer, which converts the information from the bit maps into the control signals, also receives adjustment values, such as the number and the basic positions of the processing tools 5, for example, and takes them into account in performing the conversion into the control signals.

If the processing tools 5 are lasers, as in FIG. 2, the cutting motion of the lasers is then preferably performed by one of two conventional methods.

In one method, the beam follows the contour to be cut (vector scanning) and, accordingly, undercuts in the paper travel direction R, and cuts perpendicular to the paper travel direction R are realizable. A perforation is produced by periodically turning the laser on and off.

The other method, schematically shown in FIG. 3, is that the entire processing region of a zone Z is scanned linearly (raster scanning) and, by briefly turning on the laser, the paper 6 traveling therebeneath is punctured only along the cutting contour. A scanning direction C and the paper travel direction R can then extend at an arbitrary angle to one another.

In a further embodiment, a laser diode array 7 extending over the width of the printing press is secured in the processing unit 1, this array, in practice, being composed of individual modules. In the interest of simplicity, in FIG. 4, only four diodes 8 of the laser diode array 7 have been shown. The diodes 8, or in a non-illustrated alternative, fiber-optical waveguides, which bring the light in from diodes located farther away, have a center-to-center spacing of approximately 0.1 to 0.2 mm. The gap width of a cut on the paper 6 is preferably from 0.05 to 0.1 mm.

The laser light either shines directly on the paper 6, or the light of a plurality of diodes 8 is focused by an optical element 9, which is a lens in the embodiment of FIG. 4, onto one or more focal points 10. Three different embodiments of such an optical element 9 are shown in FIGS. 5a to 5c, and provision may be made for being able to switch back and forth among these or other suitable variants.

The embodiment shown in FIG. 5a, for focusing the light of a plurality of diodes 8 onto a focal point 10 by means of the optical element 9, is used whenever relatively high light outputs are needed in order to sever thick materials which are being imprinted, the number of combined diodes 8 then being selected accordingly.

The embodiment shown in FIG. 5b, for focusing the light of a respective diode 8 by means of an optical element 9' composed of a plurality of lens elements, is used whenever thin materials which are being imprinted are to be cut apart, or thick materials which are being imprinted are to be scored (indented).

The embodiment of FIG. 5c has an optical element 9" with which the paper 6 can be cut apart and scored in a single operation by employing the variant embodiments of FIG. 5a and FIG. 5b in parallel.

To permit a crosswise or transverse movement of the focal point 10 despite a stationary laser diode array 7, a non-illustrated arrangement is provided with which the optical element 9 can be moved crosswise to the paper travel direction R (FIG. 4) and relative to the diodes 8. Provision is made therein for a plurality of optical elements 9 per zone to be disposed in front of the laser diode array 8.

In all of the aforedescribed modes of the method for beam guidance and variant embodiments for beam focusing, the light absorption and, thus, the cutting output are improved if the geometry to be cut is preprinted with a light-absorbent color. This is very simple to do; for example, the printing press computer interprets the pixel pattern of the processing geometry also as the pixel pattern of an image having a preprinted color matching it. A number of additional advantages and capabilities afforded by preprinting the processing geometries have already been mentioned hereinbefore.

The method and corresponding apparatus which have been described above thus permit on-line, further paper processing of various types (such as cutting or scoring) in a printing press over the entire printing and paper width, respectively, with freely designable and immediately variable processing geometries.

We claim:

1. An apparatus for cutting a printing material in a printing press to any desired, curved or straight, two-dimensional geometry form with reference to a printing surface of the printing material, comprising:
   a computer having an input for digital data representing the desired, curved or straight, two-dimensional geometry form and an output for control signals;
   at least one printing material cutting tool being mounted on output side of the printing press and operatively connected to said computer and controlled by said control signals, said at least one printing material cutting tool using a laser diode for cutting the printing material to the desired, curved or straight, two-dimensional geometric form.

2. Apparatus according to claim 1, including a stationary laser diode array extending over a width of said printing press, said laser diode is a part of said stationary laser diode array.

3. Apparatus according to claim 1, including a plurality of zones defined along the width of the printing press, and a plurality of the printing material cutting tools disposed along the width of the printing press and, respectively, assigned to each of said zones.

4. Apparatus according to claim 1, wherein said laser diode array is stationary, and at least one optical element is disposed between said laser diode array and a surface of said printing material.

5. Apparatus according to claim 4, wherein said at least one optical element focuses light from at least one diode of the diodes of the laser diode array onto at least one focal point located on said printing material.

6. Apparatus according to claim 4, wherein said at least one optical element is movable crosswise to the printing material path.

7. An apparatus for cutting a printing material in a printing press to any desired, curved or straight, two-dimensional geometry form with reference to a printing surface of the printing material, comprising:
   a printing press for preprinting a printing material using a light absorbent printing ink;
   a computer having an input for digital data representing the desired, curved or straight, two-dimensional geometry form and an output for control signals; and
   at least one printing material cutting tool being operatively connected to said computer and controlled by said control signals, said at least one printing material cutting tool being mounted on an output side of said printing press and outputting a cutting light for cutting the printing material to the desired, curved or straight, two-dimensional geometric form.

8. The apparatus according to claim 7, wherein only the desired two-dimensional geometric form is preprinted on the printing material.

9. The apparatus according to claim 7, wherein said light absorbent printing ink has a light absorption which at least partially coincides with a spectrum of said cutting light.

10. The apparatus according to claim 7, wherein said printing material cutting tool is a laser diode.

11. The apparatus according to claim 7, wherein said printing material cutting tool is a stationary laser diode array having a plurality of laser diodes.

12. The apparatus according to claim 11, including a plurality of zones defined along a width of the printing press, and each laser diode of said plurality of laser diodes being disposed along a width of said printing press and, respectively, assigned to each of said zones.

13. The apparatus according to claim 12, including at least one optical element focuses light from at least one laser diode of said plurality of diodes onto at least one focal point located on the printing material.

14. The apparatus according to claim 13, wherein said at least one optical element is movable crosswise to a printing material path.

* * * * *